June 7, 1960

L. MAIER 2,939,530

ACCOUNTING OR OTHER BUSINESS MACHINES WITH
APPARATUS FOR PUNCHING CARDS OR TAPES

Filed Jan. 27, 1956

INVENTOR
Lorenz Maier
by MESTERN & FREY
Armand E. Mestern

L. MAIER 2,939,530

ACCOUNTING OR OTHER BUSINESS MACHINES WITH
APPARATUS FOR PUNCHING CARDS OR TAPES

Filed Jan. 27, 1956

INVENTOR

Lorenz Maier

MESTERN & FREY

FIG. 9

United States Patent Office

2,939,530
Patented June 7, 1960

2,939,530

ACCOUNTING OR OTHER BUSINESS MACHINES WITH APPARATUS FOR PUNCHING CARDS OR TAPES

Lorenz Maier, Oberförster-Ganter-Str. 5, Villingen, Land Baden-Wurttemberg, Germany Filed Jan. 27, 1956, Ser. No. 561,878

Claims priority, application Germany Jan. 31, 1955

18 Claims. (Cl. 164—111)

The invention relates to business machines with a printing mechanism as for instance accounting machines, adding machines, cash registers and others, by means of which any values set or calculated in the machine will be printed and passed on simultaneously and in one lump.

It is the object of the invention to create a machine of the above mentioned kind with an apparatus by means of which the values set on the keyboard of or calculated by the machine will be automatically, that is without any additional manual handling, be transferred to a punching card or a punching tape. According to the invention the machine is provided with storage means to which the values are transferred simultaneously with every working cycle of the machine and any accounting operation in accordance with the columns and decimal places provided for on the bookkeeping form. Thus when one accounting operation has been completed, for instance when the paper carriage of the machine is returned to its initial position. The storage means will transfer its whole contents to a punching card or a tape. After this the values set in the storage means may be partially or completely cancelled as desired.

Generally speaking the invention relates to a machine by means of which simultaneously with and besides the normal bookkeeping work punched cards or tapes can be produced, especially such punched tapes with registrations according to the code used in the international telegraphy.

According to a further object of the invention a transformer will be provided for the production of the punched tapes or cards with which it is possible to code complete numbers, symbols or other indications in one working step and transfer these coded indications to a storage means.

It is still another object of the invention to transfer the complete contents of the storage means belonging to one bookkeeping operation to an appropriate section of punching tape corresponding to a punched card or to a punching card itself in one single punching operation.

The invention is also directed to a reduction of the time required for the coding and transferring operations and to a saving of tape material by contracting the columns of the punched card on the punched tape.

The machine according to the invention is also provided with a device by means of which it is possible to carry out so-called zero-punchings which serve to fill up with zeros those decimal places in one column which would otherwise remain unfilled because the number to be transferred to the tape or card has less figures than the maximum provided for in that specific column.

According to the further invention the machine is provided with a tabulating device which allows a stepwise movement of the storage means in accordance with the columns of the bookkeeping form so that simultaneously with every working cycle of the machine, a number, a symbol or any other indication will be taken up into the storage means and retained there for punching in the respective places of the punching cards or tapes.

With the machine according to the invention it is also possible to automatically correct the contents of the storage means of the punching device simultaneously with any corrections carried out in the course of the bookkeeping operation. For this purpose the storage means of the punching device is so controlled by the paper carriage of the machine that it is tabulated to that position in which the correction has to be made.

One form of the invention will now be described with reference to the accompanying drawings. These show in Fig. 1a a side view partially cut away of the punching device of the accounting machine, Fig. 1b is a side view partially cut away of the accounting part of the machine, Fig. 2 a longitudinal section of the punching device, Fig. 3 a cross section of the punching device, Fig. 3a a front view of a retaining pawl, Fig. 4 a rear view partially cut away of the driving means and means for setting the storage means, for punching, for the transport of the punching tape and for the cancellation of the so-called "filling zeros,"

Fig. 4a a partial view of Fig. 4 from the left,

Fig. 4b a partial view of Fig. 4 from the top,

Figure 1A:
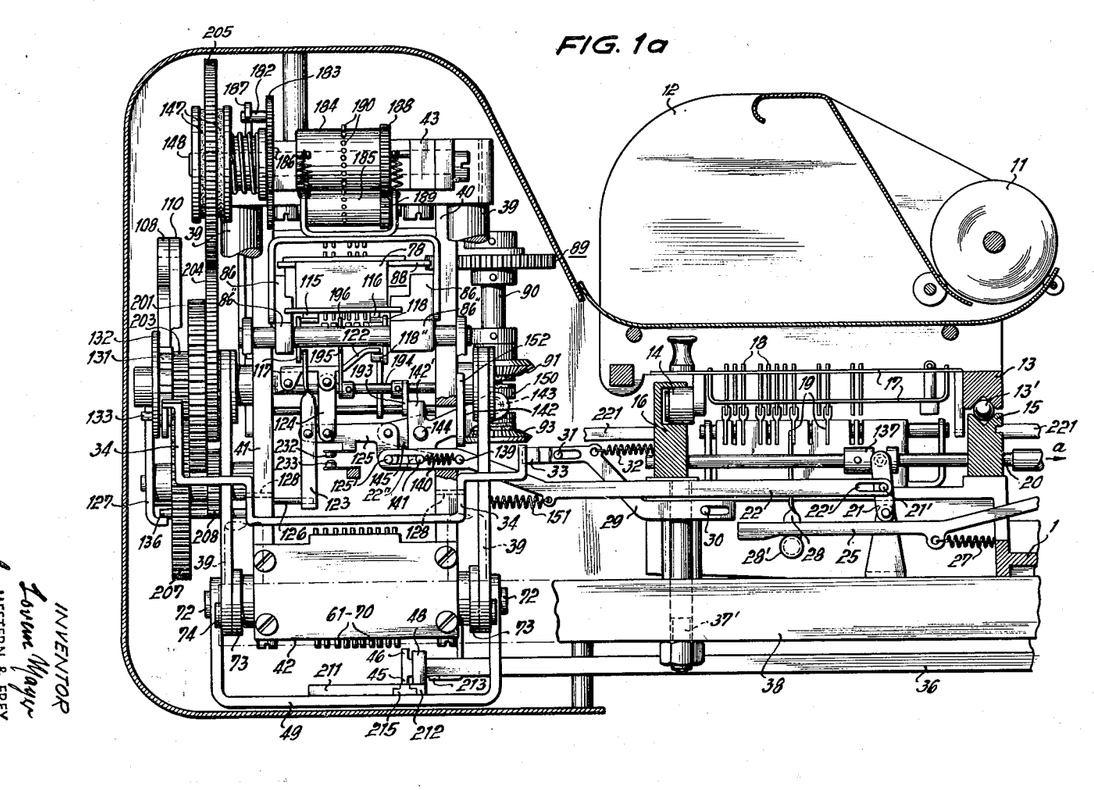
Figure 1B:
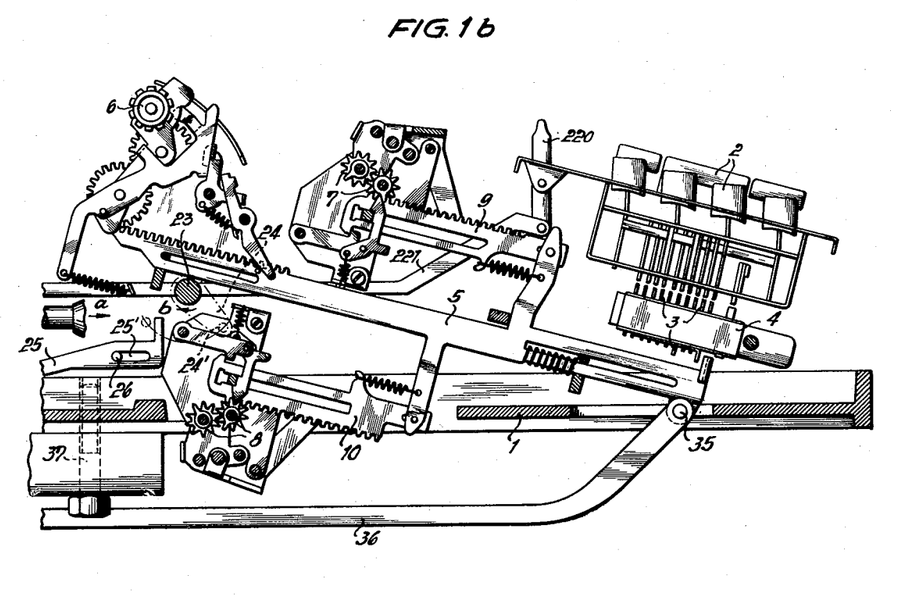

According to Fig. 1b the accounting machine has a base plate 1 and a keyboard 2 by means of which the pins 3 of a pin carriage 4 can be set. Below the pin carriage 4 there are the toothed racks 5 by means of which the values set in the pin carriage 4 will be transferred to the printing mechanism 6 and the totalizing register 7 and/or to the storage register 8 by means of toothed racks 9 and 10 connected thereto.

The printing mechanism 6 prints the values set onto the platen 11 which is mounted in the side walls of the paper carriage 12 of the accounting machine in a manner not specifically shown. The latter can move along the bars 16 and 15 fastened to the base plate 1 by means of a prism bar 13, balls 13' and rollers 14 connnected thereto, so that bookkeeping forms with any desired number of columns can be printed line by line.

At its bottom side the paper carriage has an exchangeable set 17 of control stops 18 for the automatic control of the functions to be released in any of the columns of the bookkeeping forms. The stops 18 serve to actuate stopping levers 19 mounted in the frame of the accounting machine, thereby initiating in known manner the functions of the machine to be automatically carried out in the next following working cycle of the machine.

The machine has a tabulating device which releases a movement of the paper carriage 12 to the left step by step as required under spring action. By lateral movement in the direction of the arrow "a" of the bar 20 for the carriage return this latter will be coupled to a motor (not shown), thereby moving the carriage 12 wholly or partly to the right. The bar 20 simultaneously actuates a rotatable lever 21, which moves a bar 22 by means of a bolt 21'. The bar 22 initiates, as will be described later on, the return movement of a punching mechanism. The main drive shaft 23 of the machine will be driven by the motor in the direction of the arrow "b." Fastened to the main drive shaft 23 there is a lever 24 with a bolt 24' which when being rotated will move a slide 25 to the left against the action of a spring 27, this slide 25 being guided on a frame mounted bolt 26 by means of a longitudinal slot 25'. The left end of the slide 25 lies on a roller 28' of a connecting lever 28, which is hung to one of the stopping levers 19. This lever 28 is lifted up when one of the stops 18 set for the transfer of a value into the storage means 78 swings the stopping lever 19, so that the slide 25 will be brought into line with the right end of a lever 29.

According to Fig. 1a, a frame 38 firmly connected to the base plate 1 by means of screws 37 and threaded bolts 37', to which a matrix 43 is fastened on up-right bolts 39 shown in dotted lines. The matrix 43 is carried on two walls 40 and 41 which (see Fig. 2) are connected to each other by a plate 42 at their bottom ends. Between these frame parts the devices of the machine to be described below are mounted, that is a setting device, storage means and the already mentioned punching device. Also carried by these frame parts are the driving means for the above devices.

Connecting links 36 are attached to the toothed racks 5 which each have a lower nose 45 and an upper nose 46 by means of which vertically movable pins 61 to 70 can be raised upwardly. By means of a guiding piece 48 the connecting links 36 are kept in contact with a stirrup 49 to be raised up and lowered again and can be moved backwards and forwards in their longitudinal direction together with the toothed racks 5. The stirrup 49 is provided with two plates 211 and 212, between which there is provided a cut-out portion 50 (Figs. 2, 3 and 4) so arranged that the lower noses 45 of the connecting links 36 cooperating with the toothed racks 5 are disposed opposite this cut-out portion 50, when the latter are in their zero position. Thus the connecting links 36 which have not been advanced together with the toothed racks 5 can normally not be raised up when the stirrup 49 is moved upwardly for a setting operation to be described below. The upper noses 46 can therefore normally only be brought into engagement with the vertically movable pins 61 to 70, when other figures than zero have been set up. By means of a filling piece 215 to be put into the cut-out portion 50 it is possible, at will, to influence the elements 70 for the number zero in certain positions.

Figure 8:
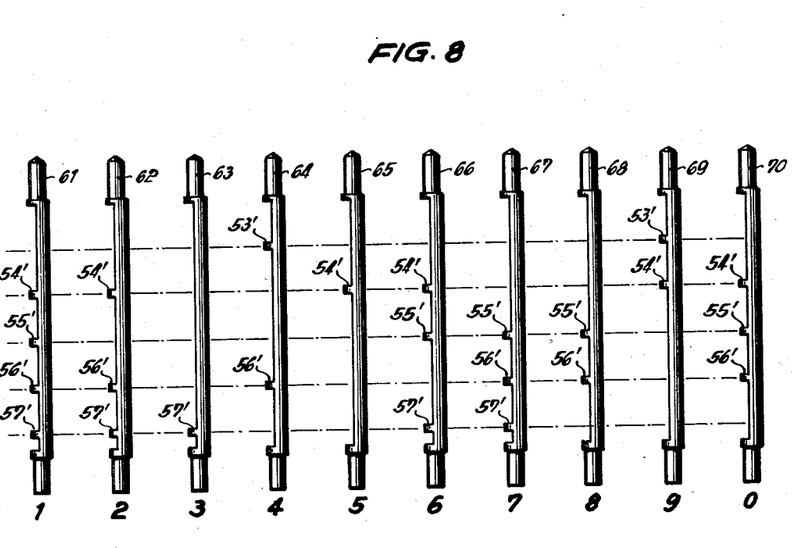
Fig. 8 pins of the coding device.

The pins 61 to 70 are mounted for vertical movement between the lower plate 42 and the upper plate 60. They each have projections 54' to 57' differing from each other as to their number and arrangement according to the code chosen (Fig. 8). When the pins are moved upwards these projections will take along one or more of the slides 53 to 57 (Figs. 2 and 3), which latter again will set one or several setting pins in the storage means 78 by means of their upper noses 53" to 57".

The pin 61 for the number 1 has, if for instance there shall be four holes in a punched tape for the number 1, four projections 54', 55', 56' and 57' for taking along the slides 54, 55, 56 and 57. The pin 62 for the number 2 has three projections 54', 56' and 57' for lifting up the slides 54, 56 and 57. The pin 63 for the number 3 has one projection 57' for the slide 57, whereas the pin 64 for the number 4 has two projections 53' and 56' for the slides 53 and 56, the pin 65 for the number 5 one projection 54' for the slide 54, the pin 66 for the number 6 three projections 54', 55' and 57' for the slides 54, 55 and 57, the pin 67 for the number 7 three projections 55', 56' and 57' for the slides 55, 56 and 57, the pin 68 for the number 8 two projections 55' and 56' for the slides 55 and 56, the pin 69 for the number 9 two projections 53' and 54' for the slides 53 and 54 and finally the pin 70 for the number 0 three projections 54', 55' and 56' for the slides 54, 55 and 56.

There are provided fourteen sets of pins 61 to 70 and slides 53 to 57 for coding an eleven number figure, two signs or other designations and possibly one additional symbol for punching in one working step.

Figure 2:
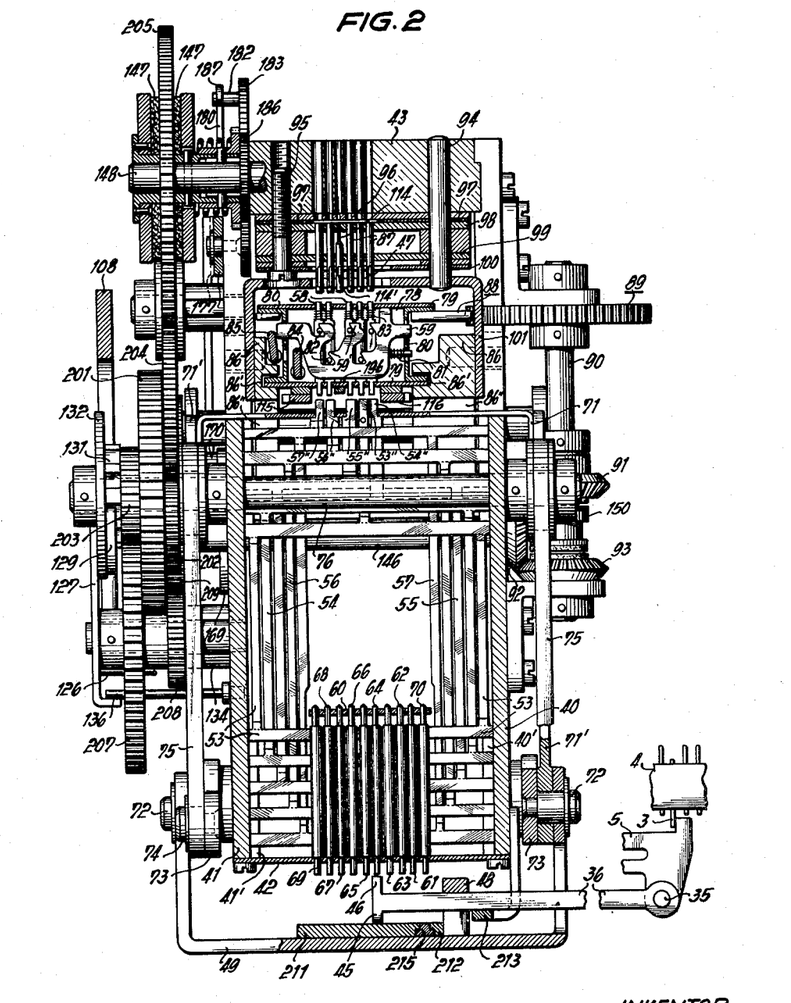
Figures 3, 3A:
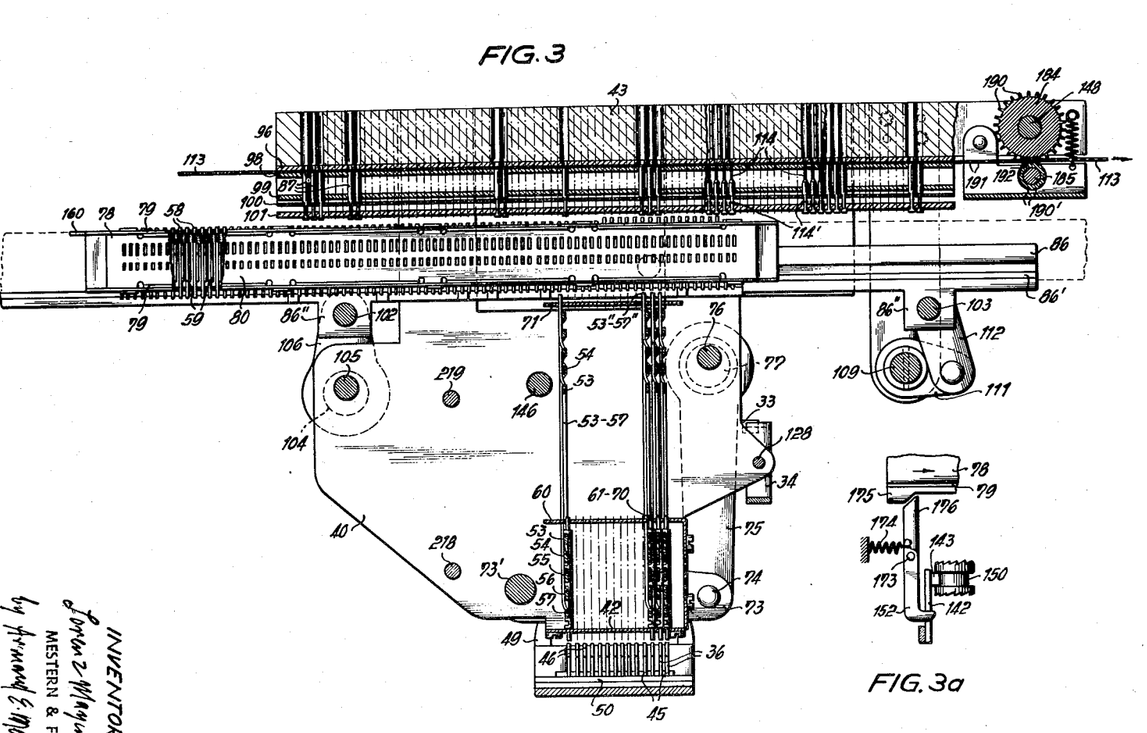

The slides 53 to 57 are made as frames with upper and lower connecting horizontal bars in order to avoid jamming. By means of their horizontal bars they are guided in longitudinal slots 40', 41' of the side walls 40 and 41, while their upper L-shaped noses 53" to 57" (Fig. 2) are guided and carried in a stirrup 71. This latter is connected to the stirrup 49 by lugs 71' and is moved with it so that the slides 53 to 57 can set pins in the storage means 78 on the upward movement of the stirrups 49 and 71 and will be returned to their zero-position on the downward movement, as shown in Fig. 2.

The stirrup 49 is connected to levers 73 by means of bolts 72, which are mounted for rotational movement on an axis 73' (Fig. 5) and have two connecting rods 75 fastened thereto by bolts 74, these connecting rods 75 being moved up and down by an eccentric cam 77 on the shaft 76. This movement up and down is followed by the stirrup 49, this latter taking along the connecting links 36 lying on plate 211 with their noses 45. Since the latter have been moved in longitudinal direction by the toothed racks 5 according to the figures set in the pin carriage 4, the upper noses 46 of the links 36 will press upwards the respective pins 61 to 70, so that the respective slides 53 to 57 are taken along in every decimal place thereby attaining a coded transmission of these figures to the storage means 78 by means of the pins 58.

The storage means 78 consists of an upper and a lower plate 79 (Fig. 2) connected to each other by U-shaped side walls 80. The plates 79 have openings for the pins 58, for instance 84 rows of 5 openings each, so that there are 84 by 5 pins=420 pins. Between each two rows of pins there are arranged slides 59 having five noses 59' each and being guided in the side walls 80 and each pushed to the left by springs 81. The pins 58, which are pressed down by springs 83, have horizontal projections 82 which, when the pins 58 are lifted up by the slides 53 to 57, are pushed over the noses 59' of the slides 59 drawn to the left by the springs 81 thereby locking the pins 58. For cancelling the settings in the storage means 78 there are two bars 84, 85 moving the slides 59 to the right so that their noses 59' release the pins 58 which will be returned to their lower initial position by their springs 83. There will also be a cancellation of the values set in one row in the storage means when new values are being set in that same row or when any value already set has to be corrected, since in this case the pins 58 lifted up for the correction operation will press their horizontal projections 82 against the lower slanting edge of the noses 59' thereby pushing the slides 59 to the right so that the noses 59' will release the previously set up pins 58.

The storage means 78 are guided on rails 86 which can be lifted up with the storage means 78 towards the punching stamps 87 when the values set in the storage means shall be transferred to a punched tape or a punched card. For this purpose the pins 58 set in the storage means press the respective punching stamps 87 upwards so that these latter each punch a hole into the tape 113. There is a toothed rack 88 in mesh with the storage means 78 serving for a lateral movement of the storage means, this toothed rack 88 being itself in mesh with a toothed wheel 89, which is fastened on a shaft 90. This shaft 90 can be rotated in both directions by means of a bevel gear 92 meshing with two bevel gears 91 and 93 on shaft 90. This forward and return movement of the storage means 78 will be described below.

The cancelling bar 84 is mounted inside the storage means 78 and serves for a complete cancellation of all values set in the storage means. It will be actuated in a manner not specifically shown from the outside. The cancelling bar 85 is mounted outside the storage means 78 and serves for a partial cancellation. Both bars 84 and 85 can be provided with such cut-out portions that only a certain, predetermined part of the settings in the storage means 78 will be cancelled when one or the other of the bars 84, 85 is actuated.

The matrix 43 is fastened to the side walls 40 and 41. It has a punching plate 96 fastened thereto by guide bolts 94 and screws 95 and two sheet metal plates 97 for limiting the lateral movement of the punching tape 113. There are also an upper and a lower guide plate 98 and 99 for guiding the punching stamps 87 and a frame plate 100. Mounted between the side walls 40 and 41 there is a frame 101 to be moved up and down. Screwed to this frame there are the already mentioned rails 86 having slots 86' for carrying and guiding the storage means 78.

Figure 5:
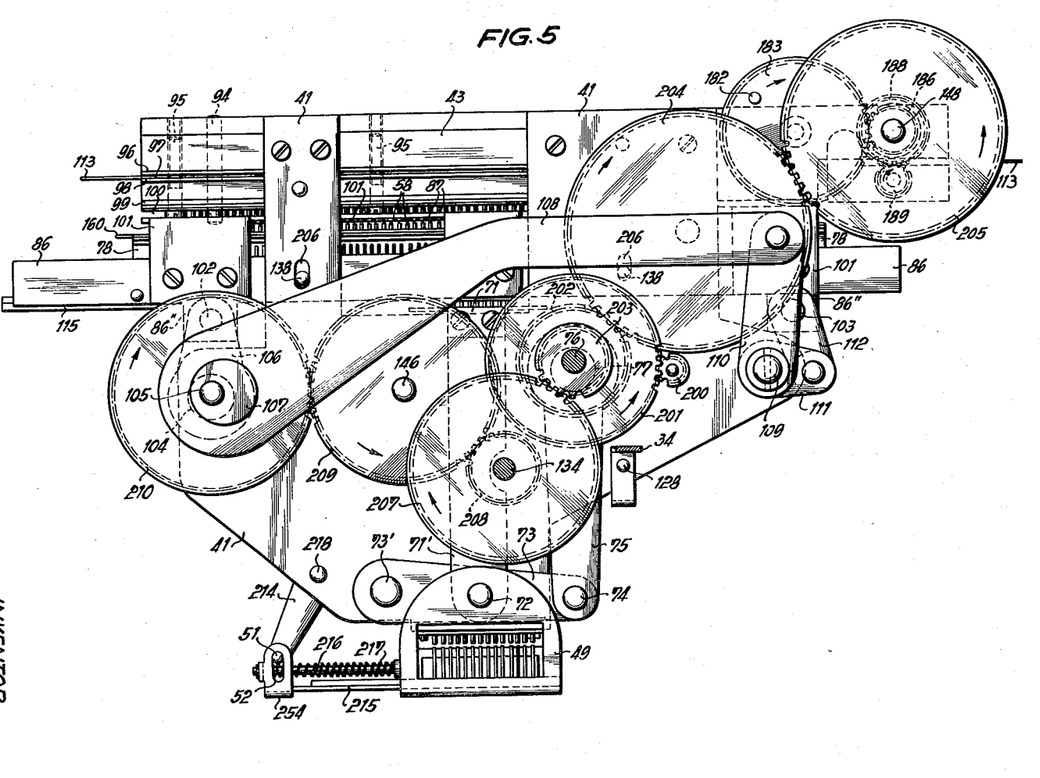
Fig. 5 a rear view of the driving means for the various functions.

The rails 86 have lugs 86" to which through-going bolts 102 and 103 are fastened (Fig. 5). For the punching operation the two rails 86 must be moved up and down together with the frame 101 and the storage means 78. For this purpose (see Fig. 5 left) there are arranged eccentric cams 104 with levers 106 on a shaft 105 driven by the motor on both sides of the rails 86. The upper ends of the levers 106 are put round the bolts 102. The shaft 105 furthermore carries another eccentric 107 with a push rod 108, which by means of a lever 110 connected to its right end turns a shaft 109 in both directions. Two further levers 111 fastened to shaft 109 are linked to the levers 112, the upper ends of which latter are put round the bolts 103. The rails 86, frame 101 and the storage means 78 will therefore be moved up and down by the levers 106 and 112 on each rotation of the shaft 105. The rails 86 have bolts 138 moving in longitudinal slots 206 of the side walls 40, 41.

When the frame 101 and the storage means 78 are moved up the pins 58 set by the slides 53 to 57 push the respective punching stamps 87 upwards, so that the latter will punch holes into the punching tape 113 moving along between the lateral plates 97. There is still a sixth punching stamp 114 with a smaller diameter, which punches holes 191 into the tape 113 serving for the transport of the tape 113.

The punching stamps 87 and 114 have flat portions 47 so that they are provided for a limited movement in the frame plate 100. When the frame 101 is moved upwards it does not take along the punching stamps 87, which are only pushed upwards by the pins 58. The stamps 114 have offset portions 114' by means of which they are connected to the frame 101 so that they are taken along on each movement of the frame 101 thereby punching transport holes 191 throughout the tape 113 on each punching operation. On the return movement of the frame 101 into its initial position it also takes those punching stamps 87 at the lower edges of their flat portions 47 along which have been previously set by the pins 58. That means that the punching stamps 87 are withdrawn from the matrix 43, but are secured in their lower position by the frame plate 100.

Fastened to the lower frame plate 79 of the storage means 78 there are two exchangeable control bars 115 and 116 provided with cut-out portions, which cooperate with pawls 117 and 118 (see Figs. 2, 4, 7a to 7d), the working method of which will be described below. While the control bar 115 serves for the tabulation of the storage means 78, the control bar 116 is adapted to initiate the punching of so called filling zeros, in cases where the figures to be transferred to the punching tape 113 have less decimal places than the maximum provided for in this column.

Figure 6:
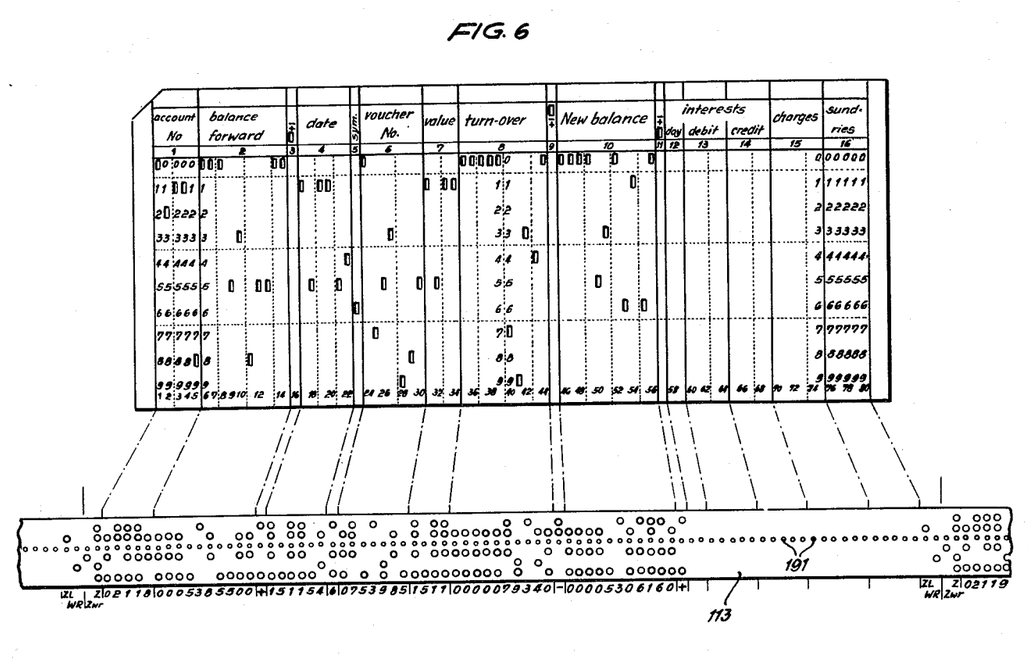
Fig. 6 a punched card and a punched tape.

As may be seen from Fig. 6 there are columns on a punched card corresponding to sections on the tape 113, the respective sections of the punching tape 113 however being wider than the columns on the punching card. It is therefore easier to transfer the whole contents of a punched card to a tape. In cases where there are not registrations in every column of the card in one accounting operation, in the case shown for instance in the columns 12 to 16 or may be even in three columns only, then only the contents of those columns having registrations must be transferred to the punched tape. Irrespective of whether the columns containing registrations are adjacent each other or not they can be transferred to the punched tape one registration following immediately upon the other. The so shortened tape can be punched either at the left end of the storage means or in the middle.

At the beginning and at the end of the registrations belonging to one card the tape will receive perforations for operations like changing card, or for any figures which will remain permanently set in the storage means. Owing to this shortening of the tape corresponding to one punching card the above mentioned prolongation of the tape in respect to the card is not only balanced but the consumption of tape and the time required for the transport of the tape after each accounting and punching operation is also considerably reduced.

In Figs. 7a to 7d the numbers 1 to 16 represent the columns of the punched card and the numbers followed by an "x," for instance 5x, 11x, 10x etc. give the maximum number of punchings to be taken up by one column or one section of the card. It will be seen that the cut-out portions of the control bar 115 correspond to the sequence of columns on the punched card, their distance from each other, however, being equal to the partitions on the punched tape 113, whereas the cut-out portions of the control bar 116 have also the same sequence of columns, which, however, as for its lateral disposition deviates from that of the control bar 115.

The pawls 117 and 118 to be actuated by the bars 115 and 116 are arranged as follows:

The pawl 117 is mounted for rotational movement on a bolt 119 fastened to the side wall 41 (Fig. 4) and connected to a two-armed lever 125 over a connecting rod 123. The pawl 118 is on one side connected to a two-armed lever 121 by means of a bolt 120, the lever 121 being carried on a shaft 218, on the other hand it is connected to a flap 122, this flap 122 being also connected to the angle lever 125 over the rod 124 (Fig. 1a).

The connecting rod 123 (see Fig. 4) has a turned-over lug at its lower end with which it catches a bolt 126 of an angle lever 127, which is itself rotatably mounted on a bolt 134 fastened to the side fall 41 and which is acted on in clockwise direction by a spring 135 pulling it against an irremovable stop 136. The upper arm of the angle lever 127 is in the way of a bolt 133 which is provided on a disc 132 firmly connected to the shaft 76. The disc 132 carries a pawl 129 rotatable round a bolt 129', which tries to go into engagement with one of the tooth spaces of the toothed wheel 131 under the action of a spring 130, the pawl 129 being retained, however, by the upper end 34' of a stirrup 34 rotatable round a bolt 128, until this stirrup 34 is swung round in clockwise direction. This swinging movement of the stirrup 34 (Fig. 1a) is effected by the slanting back edge 33 of the slide 29, when the latter is pushed backwards. This rearward movement of slide 29 is brought about by the slide 25 being lifted up and pushed rearwards by the bolt 24' on lever 24 connected to the main drive shaft 23 (Fig. 1b). The lifting movement of the slide 25 is effected by respective stops 18 in every column, in which registrations shall be made, this stop 18 actuating the stopping lever 19, thereby lifting up the slide 25 through the connecting rod 28 and its roller 28'.

Figures 4, 4A, 4B:
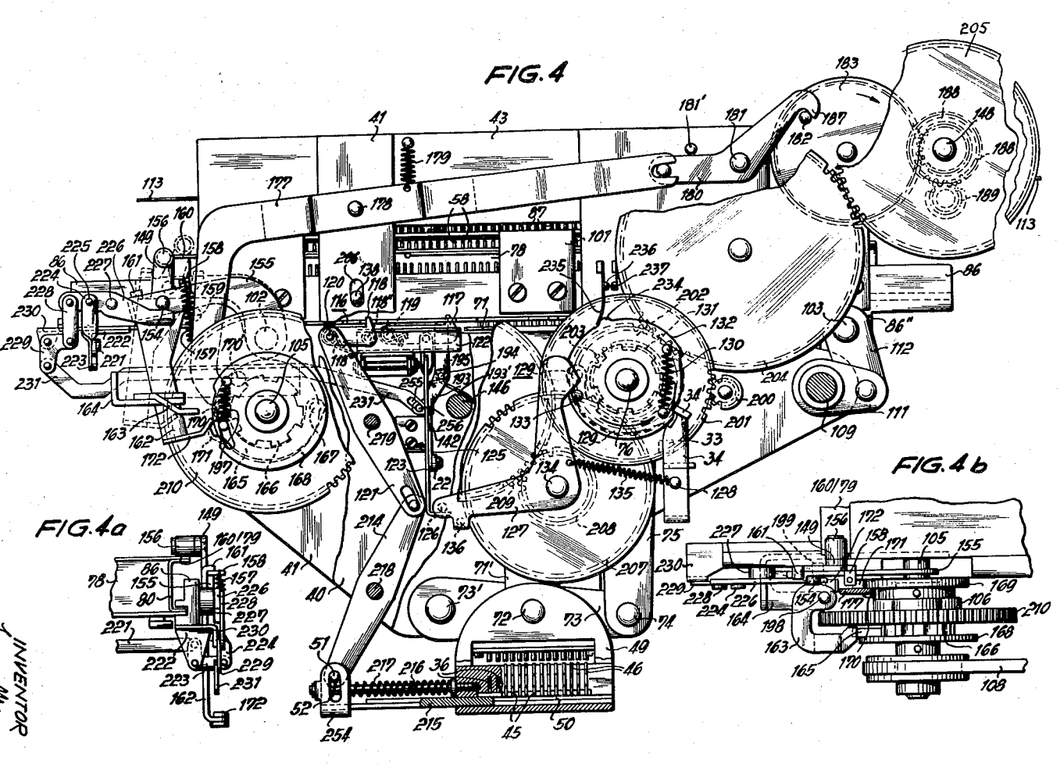

For each accounting operation the stirrup 34 is therefore swung round in clockwise direction so that the pawl 129 is released to go into engagement with one tooth space of the wheel 131. The disc 132 and the shaft 76 rigidly connected thereto are thereby coupled with the toothed wheel 131 for one revolution, wheel 131 being rigidly connected to the toothed wheel 201 which is loosely mounted on shaft 76. This wheel 201 is in permanent engagement with toothed wheel 200 which is driven by an additional motor not shown. After one revolution of shaft 76 with disc 132 in the direction of the arrow it is stopped again by the stirrup 34 engaging pawl 129, this stirrup 34 having in the meantime returned to its initial position as represented in Fig. 4.

Just before the disc 132 has terminated its rotation its bolt 133 engages the upper arm of the angle lever 127, so that this one is rotated in anti-clockwise direction. Thereby the connecting rod 123 is pulled downwards by the bolt 126, so that the pawl 117 immediately connected thereto is swung and also the pawl 118 over the angle lever 125, rod 124 and flap 122.

The previously mentioned additional motor drives through its toothed wheel 200 rigidly connected to its driving-shaft the whole device for punching the cards or tapes. The wheel 201 driven by the wheel 200 is, apart from the disc 132, also firmly connected to two wheels 202 and 203. Wheel 202 drives an idle wheel 204, which is in mesh with a wheel 205. This is firmly connected to a toothed wheel 188 and loosely carried on a shaft 148 with which it is connected over a friction clutch 147. The shaft 148 carries another toothed wheel 186, which is in engagement with a toothed wheel 183, which in a manner to be described below controls the transport of the punched tape 113. The gearing is so arranged that one revolution of shaft 148 corresponds to a movement of the punched tape 113 by the length of the registration made in one accounting operation. The wheel 188 is in mesh with a wheel 189. Also carried on shaft 148 there is a toothed drum 184 for the transport of the punched tape, while the correspondingly toothed counter drum 185 is connected to wheel 189. (Fig. 1a). For this reason the wheels 188 and 189 are geared at a ratio corresponding to the diameter of the transport drums 184, 185. The transport drum 184 has teeth 190 which mesh with corresponding bores 190' of the transport drum 185, so that the transport of tape 113 is accomplished by means of the teeth 190 meshing with the holes 191 of the tape. It is possible that at the beginning the transport of the tape may jam a little because of the bores 190' or to any other causes. For this reason the transport drum 185 is additionally provided with a projection 192 which presses the tape 113 against the drum 184 on each revolution, so that a safe transport is guaranteed.

The toothed wheel 203 is in engagement with a wheel 207, which is carried on bolt 134 and firmly connected to a wheel 208. The latter is in driving connection with a wheel 210 on shaft 105 over an idle wheel 209 carried on the shaft 146. The shaft 105 controls in a manner already described the movement up and down of the storage means 78 by means of its eccentrics 104 and 107.

The lateral movement of the storage means 78 is driven from the shaft 146, being in driving connection with the wheel 209 over a friction clutch (not shown), which is made in the same way as the friction clutch 147 already mentioned, and which is so adjusted that it moves the storage means 78 to the right or left with sufficient energy, the storage means, however, being stopped when the pawls 117 and 118 and lever 149 to be described below become effective. The bevel gear 92 on shaft 146 (Fig. 2 right) is in permanent engagement with the bevel gears 91 and 93 loosely carried on shaft 90. Between the latter two there is an Oldham clutch 150 unrotatably, but axially movable carried on shaft 90. When this clutch 150 couples bevel gear 93 with shaft 90 in its lower position, the storage means 78 is drawn to the right over the wheel 89 and the toothed rack 88 for tabulation. When clutch 150, however, is brought to its upper position it couples bevel gear 91 with shaft 90, so that the storage means 78 is moved in the other direction, that means it is returned.

The clutch 150 is controlled by the angle lever 142 (Fig. 1a) which engages an annular slot of this clutch with its roller 143 and which is rotatable round a bolt 144. This bolt 144 is carried in a rigid bracket 145 fastened to the side wall 40. The angle lever 142 is controlled by the bar 20 already mentioned, which can be moved in the direction of the arrow "a" by hand or under carriage control in a manner not specifically shown. Fastened to bar 20 there is a bush 137 which has a lever 21 with a bolt 21' connected thereto. The lever 121 is rotatably mounted on a post. The bolt 21' goes into a longitudinal slot 22' of a longitudinally movable bar 22, which is permanently drawn to the left by a spring 151 and has another longitudinal slot 22" at its left end. This slot guides a bolt 141 on the angle lever 142, acted upon by a spring 140 fastened with its other end to a bolt 139 on bar 22. In the position of the bar 22 shown in Fig. 1a the angle lever 142 can be rotated in clockwise direction so that the clutch 150 is brought into engagement with bevel gear 93, thereby tabulating the storage means 78. When the bar 20, however, is moved to the right thereby also moving bar 22 to the right by means of its lever 21 with bolt 21', the angle lever 142 is rotated in anti-clockwise direction so that the clutch 150 is brought into engagement with the upper bevel gear 91. Effecting the storage means return in this position the angle lever 142 is retained at its nose 142' by the pawl 152. This pawl is rotatable round a bolt 173 fastened to the side wall 40 (Fig. 3a) and is drawn in anti-clockwise direction by a spring 174. It has an upper arm 176 which is in the way of a projection 175 at the end of the lower plate 79 of the storage means 78, and is therefore swung round in clockwise direction at the end of the return movement of the storage means 78. Thereby the angle lever 142 is released and can swing round under the action of spring 151 in clockwise direction so that the clutch 150 is again brought into engagement with the bevel gear 93, thereby initiating the tabulation of the storage means 78.

The stepwise tabulation of the storage means 78 is controlled by the control bar 115 and the pawl 117 cooperating therewith. Each actuation of the corresponding stopping lever 19 results in a manner above described in a withdrawal of pawl 117 from one of the cut-out portions of the control bar 115, so that the storage means 78 is tabulated until the pawl 117 engages the next cut-out portion of the control bar 115.

During the tabulating movements the control bar 116 which cooperates with the pawl 118 is taken along. This pawl 118 is fastened to a two-armed lever 121 (Fig. 4) by means of a bolt 120 and is pressed against the flap 122 from below by a spring 118' with a roller 118". The lever 121 is rotatable round an axis 219 and hinged to another two-armed lever 214 rotatable round an axis 218, both axis 219 and 218 being mounted in the side walls 40, 41. The lever 214 has a bolt 51 at its lower end which goes into a longitudinal slot 52 of a lug 254 attached to the movable filling piece 215. This is guided by a bolt 216 and pushed to its left rest position by a spring 217. The filling piece 215 serves, as already described, to fill up the cut-out portion 50 more or less as adjusted and thereby determines how many of the connecting links 36 will be lifted at their noses 45, when the stirrup 49 is moved upwards. It may be understood that the filling piece 215 is controlled by the control bar 116 in such a way that it always fills up as many places of the cut-out portion 50 as the maximum places provided for in any one column of the bookkeeping form. When connecting links 36 have been moved by a figure which has been set, as many figures other than zero or zeros will be transferred to the storage means 78 over the pins 61 to 70 and the coding device as are covered by the filling piece 215.

It will be seen that it depends on the rotational movement of the two two-armed levers 121 and 214 how far the filling piece is pushed in, that is to say how many zeros will be set in any column. The cut-out portions of the control bar 116 which takes along the pawl 118 on the lateral movement of the storage means 78 must therefore be so arranged that so many zeros will be prepared for punching into the tape 113 as there are decimal places provided for in any one column of the bookkeeping form. It must also be taken into consideration that columns with only one decimal place are uncontrollable in this respect for constructional reasons. Such columns will therefore be controlled together with the foregoing or following column.

After the completion of each accounting operation, that is when the carriage is returned, the storage means 78 will also be returned to its initial position after having transferred its contents to the tape 113. It must be understood that the storage means must be withdrawn over so many more decimal places as its first setting position as there are decimal places provided for as a maximum in the first column of the bookkeeping form. The first cut-out portion on control bar 115, which controls the tabulating movements of the storage means over the pawl 117, stops the storage means 78 in a position corresponding to that of the first column designed to take up the account number. This column can as a maximum take up five figures (Fig. 6). The corresponding cut-out portion on control bar 116, which controls the punching of filling zeros over pawl 118, must be advanced against the respective cut-out portion on control bar 115 by five decimal places, the maximum places provided for in that specific column, so that the punching of five filling zeros in that column may be prepared (Fig. 7c).

Figure 7A:
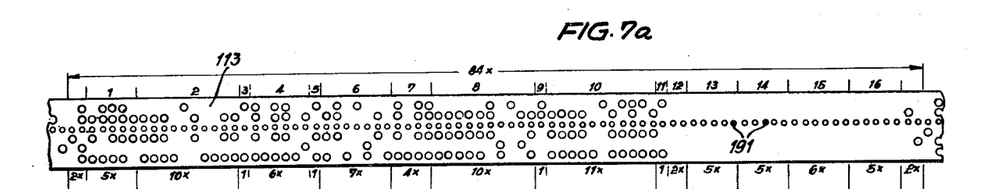
Fig. 7a a punched tape in plan view.
Figure 7B:
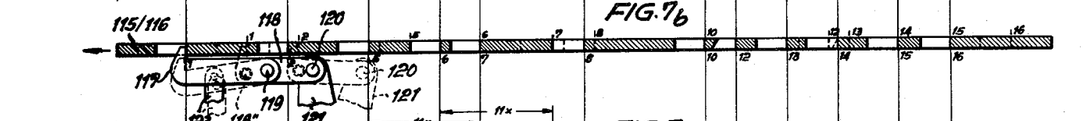
Fig. 7b a longitudinal cut of a control bar for the tabulation.
Figure 7C:
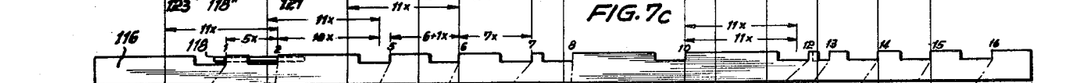
Fig. 7c a side view of the control bar for the control of the filling zeros.
Figure 7D:
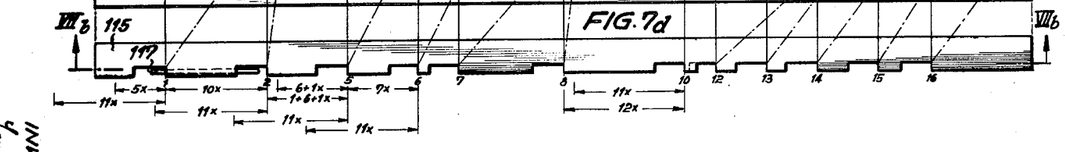
Fig. 7d a side view of the control bar according to Fig. 7b.

As was already mentioned the pawl 118 is taken along by the control bar 116, when the storage means is moved for its tabulating step to the left in Figs. 7a to 7d, or to the right in Fig. 4. The rest position of the pawl 118, shown in dotted lines in Fig. 7b, is transposed against the rest position of the pawl 117, shown in full lines, by the distance of 11 decimal places (11x in Fig. 7c and 7d), this distance being the maximum number of decimal places provided for in the widest column of the bookkeeping form.

In the example shown the pawl 118 is taken along by five decimal places in the first column, in which five places can be punched as a maximum. As a result of this the levers 121 and 214 are swung round so much, that the filling piece 215 is pushed in by a way corresponding to five places. Five connecting links 36 will therefore, when they are retained in their zero position, set zeros in the storage means 78 with their noses 45, 46 when the stirrup 49 is lifted up.

On the next tabulating step the pawl 118 is taken along out of its rest position by 10x, so that the filling piece 215 will fill up the cut-out portion 50 by ten decimal places.

On the next tabulating step the pawl 118 is taken along out of its rest position by 10x, so that the filling piece 215 will fill up the cut-out portion 50 by ten decimal places.

Since, as it was already mentioned above, there can be not tabulation in one-place columns, such columns must be filled up together with the neighbouring columns, see for instance columns 3 to 5 and 9 and 10 in Fig. 6.

Since the control bars 115, 116 are detachably connected with the storage means 78 they can be replaced by others when the bookkeeping form or the punching cards are exchanged.

The following device—see Figs. 4, 4a and 4b—serves for the control of the punching operation, that is the movement up and down of the storage means 78:

The throughgoing bolt 102 carries a rotatable lever 155. This lever carries on a bolt 154 a rotatable lever 149, which has two lateral turned-over lugs 158 and 161 serving as stops, a roller 156 at its upper end, and a lower arm 162. The lever 149 is acted on by a spring 157 which tends to draw it in clockwise direction towards the lever 155 until its right lug 158 lies on the upper edge of the lever 155. During the tabulating movements of the storage means 78 the roller 156 of the lever 149 runs on a rail 160 which is a lateral extension of the upper plate 79 of the storage means 78. When the storage means 78 has on its tabulating movements passed that lateral position which corresponds to the punching position, the roller 156 will slide off the rail 160 so that the spring 157 can now draw the lever 149 and with this one also the lever 155 in anticlockwise direction towards a stop 159. This is the preparation for stopping the storage means 78 in the punching position and for the punching itself. From this position the storage means 78 will be moved backwards in a manner to be described below. On the return movement of the storage means—to the left in Fig. 4—the rail 160 will come up against the roller 156 of the lever 149, swinging round this latter one in clockwise direction until its lug 161 engages on the upper edge of lever 155. Its lower arm 162 can now operate the clutch to be described below thereby initiating a movement of the shaft 105, the eccentrics 104 and 107 of which effect the movement up and down of the storage means 78 in a manner above described and thereby the punching of the tape 113. Firmly connected to the shaft 105 there is a disc 168 carrying the coupling pawl 165 on a bolt 167. This pawl is under the action of a spring 197, which tends to draw it into engagement with a toothed wheel 166 firmly connected to wheel 210. Normally, however, a pawl 163 on a firm bracket 164 rotatable round a bolt 198 keeps the coupling pawl 165 out of engagement with the toothed wheel 166 by means of its extension 199. When, however, the lever 149 swings round its lower arm 162 comes up against the extension 199 on pawl 163, so that this one swings round in clockwise direction (Fig. 4b) and thereby releases the coupling pawl 165. This pawl can now go into engagement with one of the tooth spaces of the wheel 166, thereby coupling the shaft 105 with the toothed wheel 210, so that shaft 105 can rotate.

Firmly connected to the shaft 105 there is another disc 169, which has a bolt 170 and a nose 171, which serve to stop the shaft 105 after one revolution and to initiate the transport of the punched tape 113 by the length of one registration.

The nose 171 serving to disconnect the shaft 105 from its driving connection and thereby stop it comes up against a laterally turned-over lug 172 of lever 149 just before the shaft 105 has completed one revolution and turns it in clockwise direction. This means that also the pawl 163 can swing back in anticlockwise direction, retain the coupling pawl 165 and lift it off the toothed wheel 166. The bolt 170 will come up against the lower slanting edge of a two-armed lever 177 during the last part of a revolution of shaft 105 and will swing round this lever 177 in clockwise direction until the bolt 170 has reached its rest position shown in dotted lines as 170'. The lever 177 is rotatable round a bolt 178 fastened to the side wall 41 and is acted on in anticlockwise direction by a spring 179. It is hinged to another two-armed lever 180, which can swing round a bolt 181 and which has a nose 187 at its right end. A stop pin 181' limits the clockwise movement of lever 180. When the bolt 170 of the disc 169 swings round the lever 177, this movement results in that the bolt 182 of the toothed wheel 183 is released, so that in a manner above described the drums 184 and 185 can now be rotated from the wheel 205 over friction clutch 147. After one revolution of toothed wheel 183 in clockwise direction, which corresponds to the transport of the tape by the length of one registration, wheel 183 is stopped because of its bolt 182 coming up against the nose 187 of lever 180, since in the meantime the bolt 170 has passed the lower arm of lever 177, so that this latter one and the lever 180 have again reached their initial rest position. The tape will not be moved on until after the next punching operation.

As was already described above the return movement of the storage means 78 is initiated before it is stopped in the punching position. This must be done to ensure that the storage means is always in the correct position, when the punching takes place. This return movement is controlled by a stop bar 196 (Fig. 1a) fastened to the lower side of the storage means, which comes up against a lever 195 on a shaft 194 towards the end of the tabulating movement. Fastened to this shaft 194 there is another lever 193, which is engaged by a nose 142' of the lever 142 and normally urged in anticlockwise direction by a spring 193'. When the stop bar 196 rotates the lever 193, then spring 140 can swing round the angle lever 142 in anticlockwise direction so that the clutch 150 is brought into engagement with the upper bevel gear 91 thereby initiating the return movement of the storage means 78.

This device described just now prevents the storage means return, before this latter has reached or passed its punching position, because, as long as the lever 193 has not released the angle lever 142 this latter one cannot be swung round by the spring 140. The actuation of bar 22, which otherwise controls the storage means return by hand or under carriage control, will then only result in the spring 140 being tensioned, since the bolt 141 cannot follow its draught.

In the case of corrections however, when the carriage is returned in a known and therefore not specifically represented manner, also the storage means 78 will be returned. This is done by the following device:

There is a correction lever 220 arranged behind the keyboard 2, which can be moved forward in the direction of the arrow, Fig. 1b. Hinged to this correction lever 220 there is a connecting rod 221, which is rotatably connected with an angle lever 223 carried on a firm bracket 222 (see Figs. 4, 4a). This lever 223 is hinged to a two-armed lever 226 by means of a connecting lug 224 on a bolt 225, the two armed lever 226 being rotatable round a bolt 227 fastened to the rail 86. The left arm of the lever 226 is hinged to another angle lever 229 over a connecting lug 228, the lever 229 being rotatably mouned on a firm bracket 230. The lower arm of the angle lever 229 is hinged to a push rod 231, which has a longitudinal slot 255 at its right end, into which a bolt 256 fastened to lever 193 projects. The right arm of the lever 226 goes under a bolt 154 on lever 155.

In order to avoid the pawls 117, 118 going into engagement with the cut-out portions on the control bars 115, 116 a bolt 125' (Fig. 1a) on lever 125 goes into the longitudinal slot 22" of slide 22. When this slide is pushed forward during the return movement of the storage means the angle lever 125 will be swung in anticlockwise direction, so that the pawls 117, 118 are withdrawn from the control bars 115, 116.

Therefore when the correction lever 220 is actuated the lever 226 is swung round in anticlockwise direction over the connecting rod 221, angle lever 223 and lug 224. This results in a rotation of the above mentioned lever 193 over the push rod 231, so that lever 193 releases the return movement of the storage means 78 without the storage means 78 having previously passed the punching position. On the other hand the right arm of lever 226 lifts up lever 155 at its bolt 154 and thereby also the lever 149, so that the shaft 105 will not be coupled with toothed wheel 210. No punching movement of the storage means 78 and no movement of the drums 184, 185 for the transport of the tape 113 will therefore take place.

In order that the additional motor for driving the punching device may not be permanently under current it is switched in together with the main motor driving the accounting machine over a mutual switch. But it is also possible that the accounting operations to be carried through on the accounting machine are finished before the work to be done by the punching device has been completed. Since the accounting machines are generally provided with an automatic switch, which after the completion of each accounting operation stop the machine and switch off the motor, provision must be made that the additional motor for the punching device is kept running until the end of the punching operation and until all parts have been returned to their initial position.

To this end there is a movable contact 232 arranged on the angle lever 125 (Fig. 1a) opposite a firm counter-contact 233. This pair of contacts 232, 233, which is arranged in an independent electrical circuit for the additional motor, is closed during the tabulating movements of the storage means 78 and also during the punching operation. A second movable contact 236 is fastened on a leaf spring 235 (Fig. 4), which in the rest position of the disc 132 is lifted off a firm counter contact 237 by a projection 234 on this disc 132. As soon as the disc 132 begins to move the projection 234 no longer retains leaf spring 235, so that the contacts 236, 237, which are also arranged in an independent electrical circuit of the additional motor, are closed and remain closed until the disc 132 has terminated its rotation. Therefore the setting of the storage means will not be disturbed.

The machine shown in the drawings only by way of example can be modified in many ways without leaving the scope of the invention. For the purpose of saving tape material and working time for instance it is possible, as was already indicated above, to reduce the length of the tape to be punched to such columns as actually contain any registrations. To this end the transport of the tape will be adapted to the reduced demand for tape material, since only a part of the total transport or a part of the storage means will actually be used. For this purpose the toothed wheel 183, which serves for the control of the tape transport, can be provided with several bolts instead of with one bolt 182 or it can be driven at another gear ratio.

Figure 9:
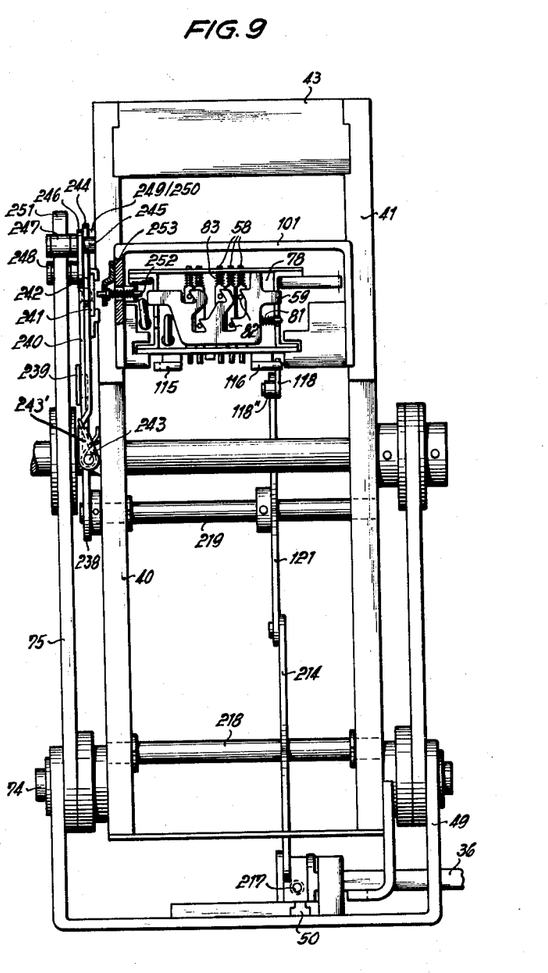
Fig. 9 a side view of a special form of the cancelling device for the storage means, Fig. 9a a rear view of the same device, Fig. 9b a partial plan view, partially cut away of the same device.
Figure 9A:
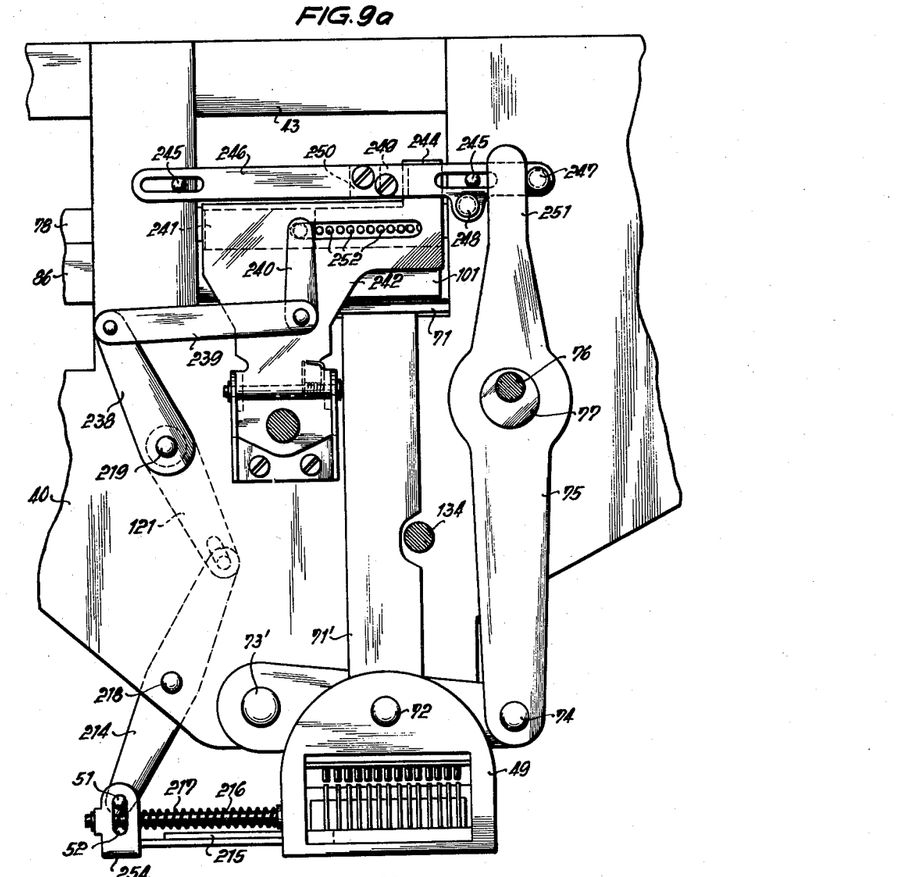
Figure 9B:
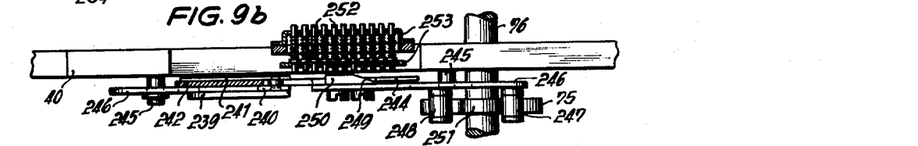

A particularly simple and yet well functioning form of a device for the cancellation of the settings—pins 58—in the storage means 78 shall be described with reference to Figs. 9, 9a and 9b. With this device always as many setting pins 58 are returned to their lower position, i.e. cancelled for the setting up of new values as the respective column has decimal places. This is done by the control bar 116 provided for the control of the filling zeros device together with the lever 121 hinged thereto. This lever 121 is fastened on the rotatable axis 219, which has an additional lever 238 firmly connected thereto. Hinged to the upper end of this lever 238 there is a push rod 239, which moves the slide 241 over its fixed arm 240 by so many decimal places as the filling piece 215 for the filling zeros has been moved into the cut-out portion 50. The slide 241 is guided in a flap 242, which is mounted for rotational movement round an axis 243 along the side wall 40, and has an upper extension 244. A spring 243' on axis 243 urges flap 242 in clockwise direction. Along the back side wall 40 there is arranged a slide 246 guided on two bolts 245, which has two rollers 247 and 248 as well as an enforced partition with a slanting edge 249. The slide 246 is laterally moved backwards and forwards at the rollers 247, 248 by an extended arm 251 of the rod 75 from the eccentrics 77. The flap 242 is thereby swung round a little way, since the slanting edge 249 cooperates with the extension 244. The slide 241 guided in the flap 242 therefore depresses so many bolts 252 as there are decimal places provided for in the corresponding column and as filling zeros have been set up. The bolts 252 being each under spring action are guided in two brackets 253, which are fastened to the frame 101. When the bolts 252 are depressed by the slide 241 or the flap 242 they will each come up against one of the slides 59, pushing the latter to the right against the action of the springs 81. The set pins 58 will thereby be released at their horizontal extensions 82 and returned to their lower position by the springs 83, that is cancelled. Immediately afterwards they can be set again by the connecting rods 36. By means of the above described device it is possible to cancel the old values set up in one column in the storage means including the filling zeros, before any corrections are made or new values set up.

This cancelling device functions with exactness and is secure, so that the cancellation of the values previously set up really takes place before any new values are set up. The special advantage is that despite the device's exactness the parts serving for the driving of the storage means can be made with normal exactness of production. If so desired this cancelling device can be provided in addition to the above described cancelling bars 84, 85.

What I claim is:

1. Punching device for use with computing or bookkeeping machines comprising, actuating members differentially actuated under control of said computing or bookkeeping machine, coding means cooperating with said actuating members for coding information supplied by said actuating members, storing means cooperating with said coding means for storing coded information supplied by said coding means, said storing means being movable in a vertical direction to the differential setting movement of said actuating members and being adapted to take up information comprising at least two multi-digit figures or words, and punching means cooperating with said storing means in a predetermined position thereof for punching all coded information contained in said storing means in one lump into a tape.

2. Punching device for use with computing or bookkeeping machines comprising actuating members differentially actuated under control of said computing or bookkeeping machine, said actuating members having projections, coding means cooperating with said projections on said actuating members for coding information supplied by said actuating members, said coding means comprising slide members, rows of displaceable pins to be displaced by said projections of said actuating members, said pins having lateral projections in accordance with a code, said projections cooperating with a corresponding number of slide members, storing means cooperating with said slide members of said coding means for storing coded information supplied by said coding means, said storing means being movable in a vertical direction to the differential setting movement of said actuating members and being adapted to take up information comprising at least two multi-digit words or figures, punching means cooperating with said storing means in a predetermined position thereof for punching all coded information contained in said storing means in one lump into a tape.

3. Punching device as claimed in claim 2, in which said slide members are of a frame-like structure comprising a lower horizontal bar cooperating with said lateral projections on said pins, a pair of vertical spaced bars, and an upper horizontal bar, said upper horizontal bar having a projection cooperating with said storing means.

4. Punching device as claimed in claim 3 in which said pairs of vertical bars of said frame-like slides are disposed in spaced planes, each of the bars of one of said pairs being spaced from each of the bars of an adjacent pair.

5. Punching device for use with computing or bookkeeping machines comprising actuating members differentially actuated under control of said computing or bookkeeping machine, said actuating members being mounted for sliding movement in a frame-like member, and having projections, said frame-like member being adapted for a lifting movement of said actuating members after each setting movement of said actuating members, coding means for coding information supplied by said actuating members cooperating with said projections on said actuating members on each lifting movement of said frame-like member and said actuating members, storing means cooperating with said coding means, said storing means being movable in a vertical direction to the differential setting movement of said actuating members and being adapted to take up information comprising at least two multi-digit figures or words, punching means cooperating with said storing means in a predetermined position thereof for punching all coded information contained in said storing means in one lump into a tape.

6. Punching device as claimed in claim 5 in which said frame-like member has two plates separated from each other by a cut-out portion in form of a slot, said projections on said actuating members being located opposite said cut-out portion between said two plates in their zero position.

7. Punching device as claimed in claim 6 in which there is a movable filling piece provided between said two plates adapted to be moved to underlie said projections on said actuating members and for actuating said members.

8. Punching device for use with computing or bookkeeping machines comprising actuating members differentially actuated under control of said computing or bookkeeping machine, coding means cooperating with said actuating members of coding information supplied by said actuating members, storing means cooperating with said coding means for storing coded information supplied by said coding means, said storing means being movable in a vertical direction to the differential setting movement of said actuating members and being adapted to take up information comprising at least two multi-digit figures or words, said storing means comprising a plurality of rows of pins settable between a lower rest and an upper set position, said pins being moved from their rest position to their set position by said coding means, punching means cooperating with said pins in said storing means when in their set position, when said storing means is in a predetermined position in relation to said punching means for punching all coded information contained in said storing means in one lump into a tape.

9. Punching device as claimed in claim 8, further provided with a locking slide member adapted to cooperate with each row of said pins of said storing means for locking said pins in their rest and set positions.

10. Punching device for use with computing or bookkeeping machines comprising actuating members differentially actuated under control of said computing or bookkeeping machine, coding means cooperating with said actuating members for coding information supplied by said actuating members, storing means cooperating with said coding means for storing coded information supplied by said coding means, said storing means being movable in a vertical direction to the differential setting movement of said actuating members by means of a toothed bar attached thereto, said toothed bar engaging a wheel mounted on a shaft, said shaft being alternately driven from an electric motor over bevel gears in two directions, said storing means being adapted to take up information comprising at least two multi-digit figures or words, punching means cooperating with said storing means in a predetermined position thereof for punching all coded information contained in said storing means in one lump into a tape.

11. Punching device for use with computing or bookkeeping machines comprising actuating members differentially actuated under control of said computing or bookkeeping machine, coding means cooperating with said actuating members for coding information supplied by said actuating members, storing means cooperating with said coding means for storing coded information supplied by said coding means, said storing means being movable in a vertical direction to the differential setting movement of said actuating members and being connected to control means for controlling said movements of said storing means, and being adapted to take up information comprising at least two multi-digit figures or words, punching means cooperating with said storing means in a predetermined position thereof for punching all coded information contained in said storing means in one lump into a tape.

12. Punching device as claimed in claim 11, in which said control means comprises a control bar with cut-out portions therein, said cut-out portions corresponding as to their number and shape to the positions in which said storing means is to cooperate with said coding means and actuating members for taking up information, said control bar being engaged by a control pawl, said control pawl being disengaged from said control bar and reengaging said control bar again after a corresponding movement of said storing means under control of said bookkeeping or computing machine.

13. Punching device for use with computing or bookkeeping machines comprising actuating members differentially actuated under control of said computing or bookkeeping machine, said actuating members being mounted for sliding movement in a frame-like member, and having projections, said frame-like member being adapted for a lifting movement of said actuating members after each setting movement of said actuating members, said frame-like member having two plates separated from each other by a cut-out portion in form of a slot and a movable filling piece provided between said two plates adapted to be moved to underlie said projections on said actuating members, coding means for coding information supplied by said actuating members cooperating with said projections on said actuating members on each lifting movement of said frame-like member and said actuating members, storing means cooperating with said coding means for storing information supplied by coding means being movable in a vertical direction to the differential setting movement of said actuating members and being adapted to take up information comprising at least two multi-digit figures or words and having a control bar, with cut-out portions therein, said control bar cooperating with a control pawl controlling the movements of said filling piece in said cut-out portion, punching means cooperating with said storing means in a predetermined position thereof for punching all coded information contained in said storing means in one lump into a tape.

14. Punching device for use with computing or bookkeeping machines comprising actuating members, differentially actuated under control of said computing or bookkeeping machine, coding means cooperating with said actuating members for coding information supplied by said actuating members, storing means cooperating with said coding means for storing coded information supplied by said coding means being adapted to take up information comprising at least two multi-digit figures or words, punching means for punching all coded information contained in said storing means in one lump into a tape, driving means for said storing means to impart the latter a reciprocating movement in a vertical direction to the setting movement of said actuating members to take up information from said actuating members and said coding means and an up- and downward movement towards said punching means for transferring the coded information contained in said storing means to said punching means on the return movement of said storing means.

15. Punching device as claimed in claim 9, further provided with automatically actuated cancelling means cooperating with said slides for cancelling the settings in said storing means, said cancelling member being automatically operated on the return movement of said storing means.

16. Punching device for use with computing or bookkeeping machines comprising actuating members differentially actuated under control of said computing or bookkeeping machine, coding means cooperating with said actuating members for coding information supplied by said actuating members, storing means cooperating with said coding means for storing coded information supplied by said coding means, said storing means being movable in a vertical direction to the differential setting movement of said actuating members and being adapted to take up information comprising at least two multi-digit figures or words, said storing means comprising a plurality of rows of pins settable between a lower rest and an upper set position, said pins being moved from their rest position to their set position by said coding means, a locking slide being arranged to cooperate with each row of said pins, said locking slide being adapted to return said set pins to their rest position when being operated through the movement of others of said pins from their rest to their set position, punching means cooperating with said pins in said storing means in their set position when said storing means is in a predetermined position in relation to said punching means for punching all coded information contained in said storing means in one lump into a tape.

17. Punching device for use with computing or bookkeeping machines comprising actuating members differentially actuated under control of said computing or bookkeeping machine, said members being mounted for sliding movement in a frame-like member, and having projections, said frame-like member being adapted for a lifting movement of said actuating members once during each setting movement of said actuating members, said frame-like member having two plates separated from each other by a cut-out portion in form of a slot and a movable filling piece provided between said two plates adapted to be moved to underlie said projections on said actuating members, coding means for coding information supplied by said actuating members cooperating with said projections on said actuating members, storing means for storing information supplied by said coding means, said storing means having rows of pins movable between a lower rest and an upper set position and having cancelling means partially cooperating with said pins for returning said set pins to their rest position, said storing means being movable in a vertical direction to the differential setting movement of said actuating members and having a control bar with cut-out portions therein, said control bar cooperating with a control pawl controlling the movements of said filling piece in said cut-out portion between said two plates and the movements of said cancelling means for partially cancelling the settings in said storing means, punching means cooperating with said storing means in a predetermined position thereof for punching all coded information contained in said storing means in one lump into a tape.

18. Punching device as claimed in claim 16, in which said cancelling means is rotatably arranged on a flap moved by said control pawl, said cancelling means operating spring mounted pins, said pins moving slides, each of said slides cooperating with one row of said setting pins in said storing means and returning said set pins to their rest position when being moved by said slides.

References Cited in the file of this patent

UNITED STATES PATENTS

| | | |
|---|---|---|
| 2,064,340 | Davis | Dec. 15, 1936 |
| 2,229,905 | Sundstrand | Jan. 28, 1941 |
| 2,545,636 | Sundstrand | Mar. 20, 1951 |
| 2,615,623 | Pitman | Oct. 28, 1952 |